June 5, 1945.   H. O. EIANE   2,377,769
PROCESS OR METHOD IN THE MANUFACTURE
OF RADIAL MASTER CONNECTING RODS
Filed March 15, 1943
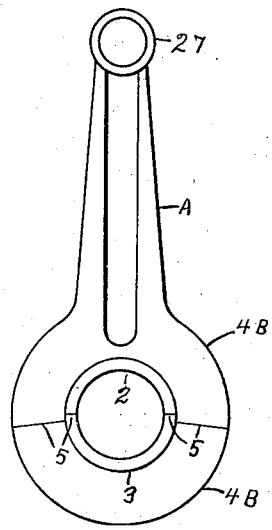
Fig.1.
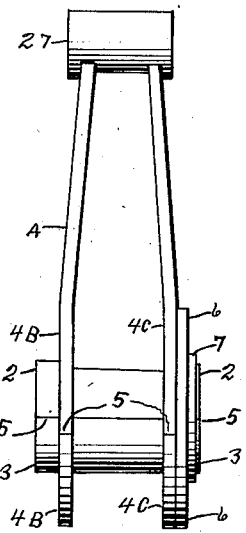
Fig.2.
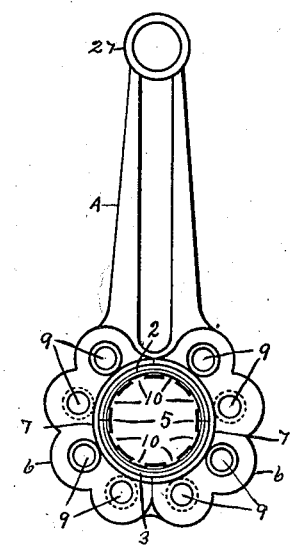
Fig.3.
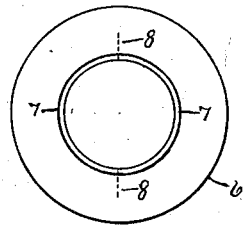
Fig.4.
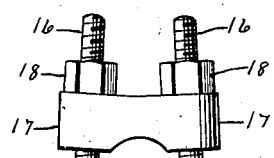
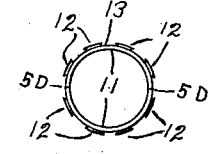
Fig.6.
Fig.5.
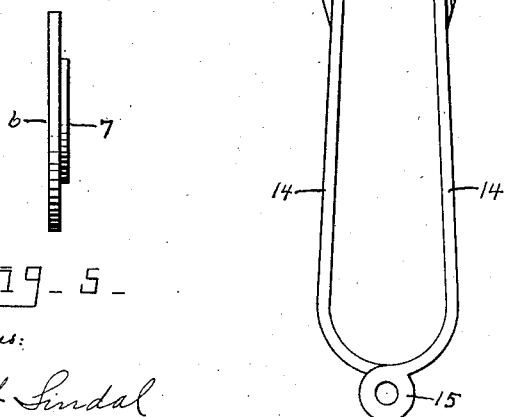
Fig.7.
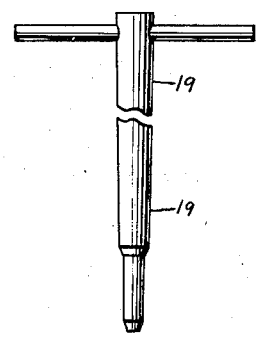
Fig.8.
Witnesses:
Jacob Sindal
Andrew Justinger
INVENTOR
Halvor Olsen Eiane Patented June 5, 1945

2,377,769

UNITED STATES PATENT OFFICE 2,377,769

PROCESS OR METHOD IN THE MANUFACTURE OF RADIAL MASTER CONNECTING RODS

Halvor Olsen Eiane, Washington Island, Wis.

Application March 15, 1943, Serial No. 479,214

3 Claims. (Cl. 29—156.5)

My invention relates to improvements in the manufacturing process of a radial master connecting rod for radial engines, such as used on aeroplanes, tanks and the like, and particularly in connection with my earlier application for patent on a Radial connecting rod, filed March 8, 1941, Serial No. 382,427, in which the process is partly illustrated and described, but not claimed (now Patent No. 2,318,474, patented May 4, 1943).

The object of my present invention is to facilitate the manufacturing process of the master connecting rod, shown and described in the above mentioned application, by means of special appliances and methods, hereinafter more fully described and claimed, having reference to the accompanying drawing in which: Fig. 1 is an axiswise front view of a master connecting rod in its early stage of manufacture, showing the division line between the upper and lower crank-pin bearing halves, (its rear view being identical to its front view). Fig. 2 is a side view of the master rod, showing a flat ring-shaped disc or flange pressed into its place at one end around the bearing halves. Fig. 3 represents a front view of the master rod as being near its finish stage, showing evolution of a ring-shaped disc emerging as a separate pair of completed joining plates. Fig. 4 is a front view of a flat ring-shaped disc in its early manufacturing stage, from which joining plates for the bearing halves are made. Fig. 5 is an edge view of the disc shown in Fig. 4. Fig. 6 is an end view of a split bearing liner or bushing, complementarily formed to fit into the bearing halves, shown in Fig. 3. Fig. 7 represents a front view of a special clamp for holding tightly together the bearing halves shown in Fig. 1, while lathe work is being performed. Fig. 8 is a side view of a special tool for use in reassembling the finished parts of the bearing halves and joining plates.

A, in Figs. 1, 2 and 3, is the main body of the master rod. 2, in Figs. 1, 2 and 3, is the upper half of the split crank-pin bearing. 3, in Figs. 1, 2 and 3, is the bottom half of the same bearing. 4B and 4C, are two circumferential ridges embracing the two bearing halves 2 and 3. 5, in Figs. 1, 2 and 3, is the division line between the upper bearing half 2, and the lower bearing half 3. 6, in Figs. 4 and 5, is the flat ring-shaped disc from which the finished joining plates for holding together the two bearing halves 2 and 3, are made, and shown as such in Fig. 3. 7, in Figs. 2, 3, 4 and 5, is an annular rib at the inner edge of the ring-shaped disc 6, to reinforce the joining plates 6, without any undue addition of weight, and to increase the area bearing directly against the two bearing halves 2 and 3. The flat ring-shaped disc 6, as shown in Fig. 4, is presawed from the inside to approximately half distance across its face, as indicated by dotted lines 8, which later on become the points where the disc 6 is sawed into two separate parts to form one set or pair of finished joining plates as shown in Fig. 3. It will be noted in Fig. 3, that the larger ends of the articulate holes 9, coincide with the outer wall of the annular rib 7, which facilitate locking of the articulate bolts which occupy the holes 9, although they do not form any part of the present application.

Referring to Fig. 3, it will be noted that axiswise grooves 10 are cut on the inside surface of the two bearing halves 2 and 3, for reception of a complementarily formed split bearing liner or bushing 11, which is made of suitable bearing metal, and on which are a plurality of axiswise lands 12, which engage the grooves 10, and thus prevent rotation of the bearing liners. At each end of the bearing liners 11, is a section 13, turned down to the bottom of the lands 12, and corresponding in length to the thickness of the walls of the bearing halves 2 and 3, and which is expanded outward to prevent endwise movements.

The division line 5D, in the bearing liners 11, coincide with the division line 5 between the bearing halves 2 and 3, shown in Figs. 1, 2 and 3.

The manufacturing process involved in the production of this master connecting rod, is the chief feature of this invention; and the various stages in this process are as follows: First, a rough drop-forging in one piece is produced, which then is sawed and milled to form the irregular division line 5 between the two bearing halves 2 and 3; this process entails a certain amount of material shortening at the division line, for which provision must be made in the original drop-forging; next, the now two pieces forgings are placed in a special long U-shaped clamp 14, shown in Fig. 7, which is hinged at 15, and provided with two threaded end-sections 16, which pass through the yoke 17 and followed up by the two nuts 18, which furnish the clamping pressure for drawing tightly together the two bearing halves 2 and 3 (it will be borne in mind that the hinge 15 will be under the bearing half 3, and between the circumferential ridges 4B and 4C, while the yoke 17 will bear against the wrist-pin bearing 27, so designated to correspond with the same designating numeral in the afore-mentioned application); next, the master rod forging under pressure of the clamp 14 is placed in a lathe chuck and the inside of the bearing halves 2 and 3 bore out to required size, while the outside portion of the bearing halves projecting axiswise from the ridge 4B is turned down to precision size, its end surface faced, and the front surface of the ridge 4B faced at right angle to the axis of the bearing halves, after which the master rod forging is reversed in the lathe chuck and the same operations performed on its rear portion, including facing the rear surface of the ridge 4C, but the inside boring of the bearing halves is finished in the first operation and thus aids in lining up the master rod in the lathe chuck for the second or last operation, and the lathe work is then done; next, a pair of flat ring-shaped discs 6, as shown in Figs. 4 and 5, having their center portion bored out to fit tightly around the bearing halves 2 and 3 which extend axiswise from the circumferential ridges 4B and 4C, are then pressed on by means of a hydraulic or screw-press until seated against the flat faced walls of the ridges 4B and 4C (one such disc is shown as being in place, in Fig. 2); next, the clamp 14 can then be removed from the master rod, as the pair of discs 6 will keep the bearing halves 2 and 3 firmly together so that the milling operations between the ridges 4B and 4C can be performed, the holes 9 drilled and reamed out to exact sizes, the grooves 10 in the bearing halves 2 and 3 cut, and the bearing liners 11 inserted and expanded into place, and all surplus metal at the outer edges of the ridges 4B and 4C and the discs 6 removed, and each half side of the discs 6 marked to their respective places against the ridges 4B and 4C (marks not shown), and finally with a small circular saw, the discs 6 are cut to meet the initial cuts as indicated by dotted lines 8, in Fig. 4, and with removal of surplus metal at the separating points, the joining plates 6 are finished as shown in Fig. 3.

It will be particularly noted, as in Fig. 4, that the dotted lines 8 indicate cuts made prior to being pressed onto the bearing halves 2 and 3, and that this pre-sawed line must be exactly at right angles to the division line 5, shown in Figs. 1 and 2, so that a circular saw can be employed in the final separation of the discs 6, which otherwise could not reach into the sharp corners.

In reassembling of the bearing halves 2 and 3, and the now separate joining plates 6, a tapered tool 19 is provided which fits the holes 9, to bring them into alignment for insertion of articulate bolts, which however, is no part of the present application.

Having thus described my invention what I claim as new and desire to secure by Letters Patent is:

1. In the method of manufacturing radial master connecting rods for internal combustion engines having split crank-pin bearing of upper and lower halves embraced by a pair of spaced circumferential ridges and end portions of bearing halves extending axiswise from the said ridges, those steps which consist in milling the division line between the upper and lower bearing halves, placing rod and lower bearing half full length within a hinged screw clamp and applying external pressure thereon, placing clamped rod in a lathe chuck and performing various lathe operations comprising internal boring out of said bearing halves in axiswise relation, trueing up external periphery of end portions of said bearing halves, and facing external walls of said spaced circumferential ridges adjoining said end portions of said bearing halves for receiving a pair of flat ring-shaped discs to supersede said hinged screw clamp as means for exerting external clamping pressure upon said bearing halves.

2. In the method of manufacturing radial master connecting rods for internal combustion engines having split crank-pin bearing of upper and lower halves embraced by a pair of spaced circumferential ridges and end portions of bearing halves extending axiswise from said ridges, those steps which consist in partially sawing a pair of flat ring-shaped discs from their inside along a line across the diametrical center of said discs, placing said ring-shaped discs upon said end portions of bearing halves in an arranged position to coincide said partial sawing with a longitudinal line drawn through the center of said rod, pressing said discs against said circumferential ridges to maintain said bearing halves in clamped relation and to facilitated machine operations comprising milling out spaced portion between said ridges and along said rod, and to facilitate drilling and reaming of holes through said ring-shaped discs and said circumferential ridges in axiswise relation and in alternate style from opposite ends thereof for receiving articulate bolts for connection of articulate rods thereto.

3. The method of manufacturing radial master connecting rods having split crank-pin bearing of upper and lower halves embraced by a pair of spaced circumferential ridges and end portions of bearing halves extending axiswise from said ridges, the manufacturing steps in connection therewith which comprises partially sawing a pair of flat ring-shaped discs from inside along a line across their diametrical center, pressing said discs tightly upon said end portions of bearing halves for exerting external clamping pressure upon said bearing halves to facilitate milling and drilling operations on said master connecting rod in the removal of surplus metal including cutting of internal axiswise grooves in said bearing halves for receiving complementarily formed bearing liners, said bearing liners being expanded at their ends to prevent endwise movement and finished prior to severance of said ring-shaped discs into equal half circular joining plates and in line with said partial sawing.

HALVOR OLSEN EIANE.